(12) United States Patent
Fraden et al.

(10) Patent No.: US 7,178,410 B2
(45) Date of Patent: Feb. 20, 2007

(54) CLOGGING DETECTOR FOR AIR FILTER

(75) Inventors: Jacob Fraden, San Diego, CA (US);
Alex Rutstein, Oberlin, OH (US)

(73) Assignee: CleanAlert, LLC, Oberlin, OH (US)

( * ) Notice: Subject to any disclaimer, the term of this patent is extended or adjusted under 35 U.S.C. 154(b) by 53 days.

(21) Appl. No.: 11/084,607

(22) Filed: Mar. 21, 2005

(65) Prior Publication Data

US 2006/0100796 A1 May 11, 2006

Related U.S. Application Data

(60) Provisional application No. 60/555,011, filed on Mar. 22, 2004.

(51) Int. Cl.
*G01F 1/37* (2006.01)

(52) U.S. Cl. .................................. 73/861.52

(58) Field of Classification Search ............. 73/861.52; 137/101.19, 114; 454/158; 55/283; 364/138
See application file for complete search history.

(56) References Cited

U.S. PATENT DOCUMENTS 5,299,594 A * 4/1994 Lord et al. ............. 137/101.19
5,706,191 A * 1/1998 Bassett et al. ................. 700/9
6,544,309 B1 * 4/2003 Hoefer et al. .................. 55/283
6,582,295 B1 * 6/2003 Abouchaar ................... 454/158

* cited by examiner

Primary Examiner—Jewel Thompson (57) ABSTRACT

The detector for monitoring decrease in air flow rate due to air filter clogging. It is based on combination of three essential components: the air flow sensor, a threshold detector and an indicator. The air flow sensor is built in form of a novel thermo-anemometer which contains a thermistor, a heating element, and a thermal insulator. Temperature of the sensor is maintained above the air temperature by a constant value by means of an electronic servo circuit. The threshold detector is implemented either in a hardware or software. A novel design of a thermo-anemometer (closely related to a hot wire anemometer) automatically compensates for variations in the air temperatures. The thermo-anemometer triggers the threshold circuit when air flow rate drops below a preset level. For reduction of power consumption, the detector may employ two additional sensors: one is for detection of the blower operation and the other is a presence detector to enable the alarm in presence of people to perceive the alarm. The device automatically calibrates itself upon installation of a new or cleaned air filter. The applications include residential and commercial air conditioners, air heaters, internal combustion engines, vacuum cleaners and other systems where air filters are employed.

12 Claims, 7 Drawing Sheets

CLOGGING DETECTOR FOR AIR FILTER

The present invention relates generally to devices for monitoring a functional state of equipment, and more particularly to a device for detecting a degree of clogging of a gas (air, e.g.) filter and producing a signal indicating the same. This patent is based on U.S. Provisional Patent Application No. 60/555,011 filed on Mar. 22, 2004.

BACKGROUND OF INVENTION

Nearly every residential and industrial dwelling or facility, an automobile with an internal combustion engine, or a vacuum cleaner incorporates some kind of an air supply or air treatment system. These systems range from a simple ventilation duct to automatic air conditioning installations that may include heating, cooling and humidity control devices. Typically, mass of gas (air, in particular) is driven through the dwelling or machinery by means of a forced convection. This requires use of a pump or air blower. Also, they usually include filtration components (filters). The purpose of the filters is to remove airborne contaminants that may adversely effect health of humans and animals, cause malfunction or reduction in efficiency of equipment, and deposits of soiling compounds onto various surfaces.

In the automotive applications, air filters are used with the internal combustion, engines. A clogged air filter not only decreases the engine efficiency in terms of the output power and fuel consumption, but also increases the engine wear and reduces its lifetime. In this patent, we use word "air", although it should be understood that any gas or mixture of gases can be monitored in a similar manner.

A typical air filter consists of a supporting frame and a filtering layer or layers, often fabricated of paper or a mesh made of polymer fibers. The entire mass of the treated air passes through the filter. The airborne contaminants (dust, pollen, e.g.) are captured by the filtering layer using either mechanical or electrostatic action. When a significant amount of contaminants is deposited onto the filter (the filter becomes clogged), the filter's resistance to air flow increases. The clogging may have multiple negative effects: 1) the increased air flow resistance will reduce efficiency of the air treatment system, 2) the energy consumption will rise, and 3) the air flow may dislocate captured contaminants and make them airborne again. The air filter should be changed or cleaned whenever the clogging reaches an unacceptably high level. An advisable timing of such maintenance will depend on many factors—quality of supplied air, humidity, temperature, geometry of the dwelling and air ducts, power of the blower, etc. Due to many unpredictable and continuously changing factors, the appropriate timing can not be accurately guessed and, therefore, a more reliable and efficient way of the filter clogging detection is highly desirable.

DESCRIPTION OF PRIOR ART

To determine the time when the air filter needs to be replaced or cleaned, several methods are currently in use or known. These include:
1. Visual inspection. The filter is periodically removed and visually inspected for clogging.
2. Scheduled filter replacements regardless of the actual level of clogging.
3. Timers. The mechanical or electronic timers for indicating the time of a recommended maintenance, say every 3 months as taught by Honda, et al. in U.S. Pat. No. 6,239,694.
4. Pressure detectors that measure changes in air pressure differential across the air filter and trigger an indicator when the differential rises above a preset threshold. These devices are exemplified by U.S. Pat. No. 5,774,056 issued to Berry, et al.
5. Use of special air filters with both fine and rough mesh as shown in Japanese Utility Model Publication No. 55-65119.
6. Measurement of air flow at different areas of the filter furnished with the artificial flow resistors as exemplified by U.S. Pat. No. 5,205,156 issued to Asano et al.
7. Measurement of reduced air flow through the filter by use of mechanical indicators, such as whistles as taught by U.S. Pat. Nos. 6,412,435 and 6,320,513 issued to Timmons, Jr.
8. Measurement of an air flow drop by means of a rotating vane anemometer installed at an air outlet, as in a commercial device "Air Filter Alert" from Air Filter Alert, Inc. of California, U.S.A.
9. Measurement of the air blower motor characteristics which may depend on the filter resistance to air flow, as taught by Abouchaar in U.S. Pat. No. 6,582,295. This method while useful for small compartments in motor vehicles, isn't applicable to larger spaces, like houses, due to a negligible variations in the air blower response.

Figure 4:
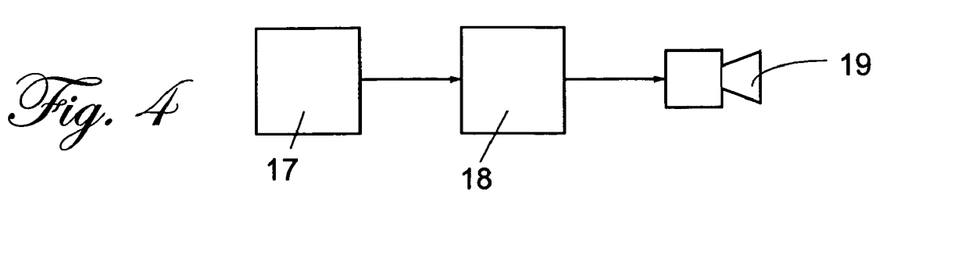
FIG. 4 is a block diagram of an air filter clogging detector.

Any air filter clogging detector would need to include three essential sections as shown in FIG. 4: sensor 17, monitor 18, and alarm 19. Below, we discuss several possible implementations.

Figure 1:
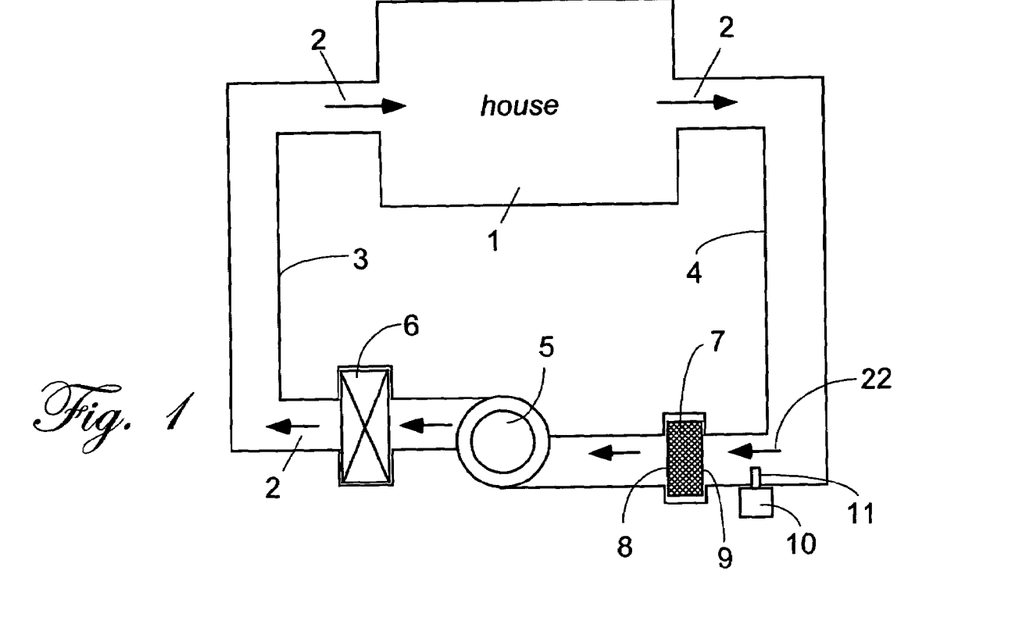
FIG. 1 is a schematic diagram of a dwelling with the air treatment system.

In general terms, an air supply system for a house or industrial facility may be represented by FIG. 1. Here, house 1 has a large volume that is supplied by a continuously or periodically moved air. Air may be drawn from outside as well as from inside, but this doesn't change the general description. The air flow direction is indicated by arrows 2. Air is forcibly moved through the circuit by blower 5. Several components may be installed to treat air to a desired quality. Therefore, air treatment device 6 may contain an air conditioner, a heater, a humidifier, a de-humidifier and other air treating devices. Contaminated air is drawn toward the blower through the filter via return duct 4 positioned upstream from the blower. The supply duct 3 (positioned downstream) delivers the treated air that should have few or no airborne contaminants. Air filter 7 is positioned upstream from blower 5 and air treatment device 6. Filter 7 has inlet side 9 and exit side 8.

Figure 2:
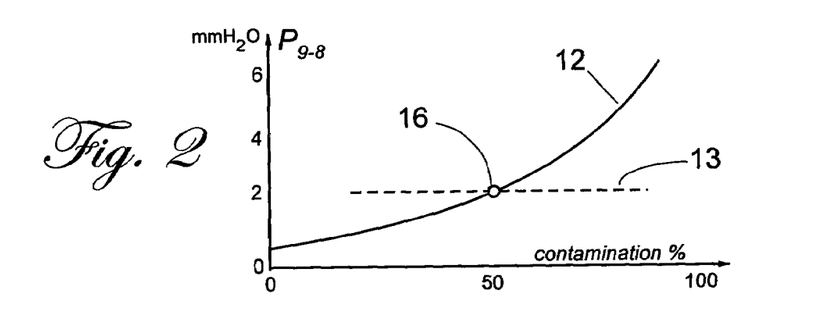
FIG. 2 is a graph of a pressure differential across an air filter as function of its clogging.

FIG. 2 is a graph of an air pressure differential across filter 7 as function of the filter clogging. It is seen that with the increased clogging, the air flow resistance of the filter increases and that, in turn, results in the increased pressure differential. Specific alarm threshold 13 may be established on a predetermined level (corresponding to 50% of air flow blockage, e.g.). When pressure differential 12 reaches that threshold 13, the monitor may trip alarm 19. Measuring the air pressure differential requires high sensitivity sensors due to relatively small pressure levels. FIG. 2 shows that in a residential dwelling a typical air pressure differential range is only several millimeters of water—a very low value indeed.

Figure 6:
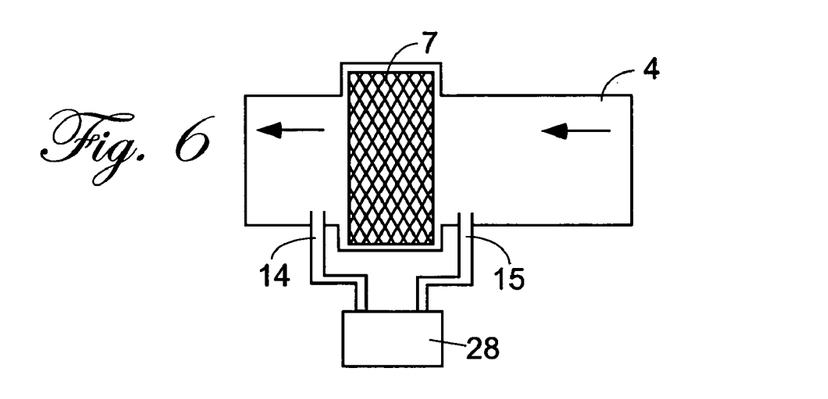
FIG. 6 shows a circuit of an air filter clogging monitor with a differential pressure sensor.

FIG. 6 illustrates a pressure differential detector. Two air tubes, 14 and 15, are positioned at both sides of filter 7 and connected to a pressure differential sensor 28. This method while efficient from the performance stand point, is relatively expensive and may pose difficulties in practical use: in many existing air supply and re-circulating systems installation of the tubes at both sides of an air filter may be difficult if not impractical due to the equipment geometry. Besides, quite often small pressure levels would requires a sensitive (thus more expensive) pressure sensor.

Figure 5:
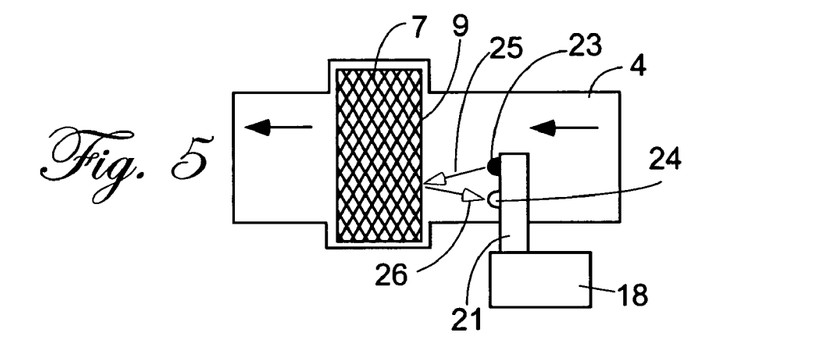
FIG. 5 shows a circuit of an air filter clogging monitor with an optical detector.

A possible method of indicating the air filter clogging is an electronic equivalent of a visual inspection. A clogged filter's surface usually changes color and that can be measured and detected. FIG. 5 illustrates an optical detector that is positioned at inlet side 9 of filter 7, inside air duct 4. Optical probe 21 is attached to monitor 18 and incorporates light emitter 23 and light detector 24. Light emitter 23 (for example, LED) sends pilot light beam 25 toward filter 7. Reflected light 26 is received by light detector 24 (for example, a photodiode). Intensity of the reflected light will change when the air filter becomes dirty. This change is detected by the circuit inside monitor 18. An obvious disadvantage of this method of detection is its dependence on the type of airborne contaminants. For example, light colored dust my clog the filter yet not triggering the alarm, while a small superficial amount of black sooth would trigger the alarm even when the filter still remains relatively clean. Besides, the light emitter and detector may become clogged themselves.

All the above methods are either time consuming, or too complex and costly, or simply not sensitive enough for detecting the filter clogging for a multiplicity of the filter and air blower configurations.

It is therefore the goal of this invention to provide a device for continuous or intermittent monitoring and indicating the degree of air filter clogging;

It is another goal of this invention to provide an air filter monitor with an alarm that can be activated when a degree of clogging reaches a preset level and the service personnel is present to perceive the alarm.

And another goal of the invention is to provide an air flow sensor that can operate over a broad range of temperatures.

It is also a goal of this invention to provide a clogging detector that operates in relation with an air blower actuation;

Still, it is another goal of this invention to monitor the system characteristics that directly correlate with the filter clogging and provide an appropriate indication of the same.

SUMMARY OF INVENTION

The invention is based on combination of three essential components supported by an air supply duct in which the filter is installed: the air flow rate sensor, the threshold detector and an alarm or other indicator. The sensor is build in form of a thermo-anemometer which contains at least one temperature sensor, a heating element, and a thermal insulator. An electronic servo controller forces the heating element to elevate temperature of the sensor above the air temperature by a fixed amount. Moving air absorbs thermal energy from the temperature sensor in relation with the air flow rate. The electric power supplied to the heating element to compensate for the heat loss serves as a measure of the flow rate. The threshold detector is implemented either in a hardware or software. The thermo-anemometer triggers the threshold circuit when the flow drops below a preset level due to a filter clogging. The threshold may be fixed or variable to correct for variations in the air flow rate. Applications include residential and industrial air conditioners and heaters, vacuum cleaners, combustive engine air filters, and others.

DESCRIPTION OF PREFERRED EMBODIMENTS

Air Heating and Conditioning Applications

Figure 3:
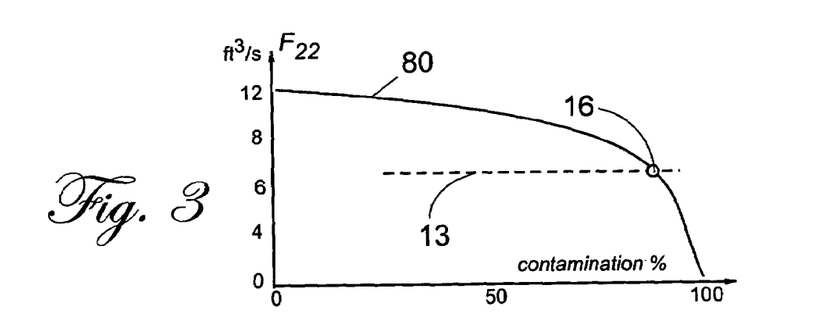
FIG. 3 is a graph showing dependence of the air flow rate as a function of the air filter clogging.

FIG. 3 illustrates what typically happens with the air flow rate 80 when the air filter collects more and more contaminants. When the filter is clean or soiled a little, it exhibits a relatively small air flow resistance and the air flow is at its maximum. When the filter collects more and more dirt, the air flow rate drops approaching zero when the filter becomes completely clogged. Threshold 13 may be set to indicate a critically reduced air flow rate at point 16. It should be noted that threshold 13 may have not a fixed but rather a variable value. The value may be controlled by signals that indicate variations in the air supply characteristics, such as temperature and an air blower power or rotation rate.

Figure 7:
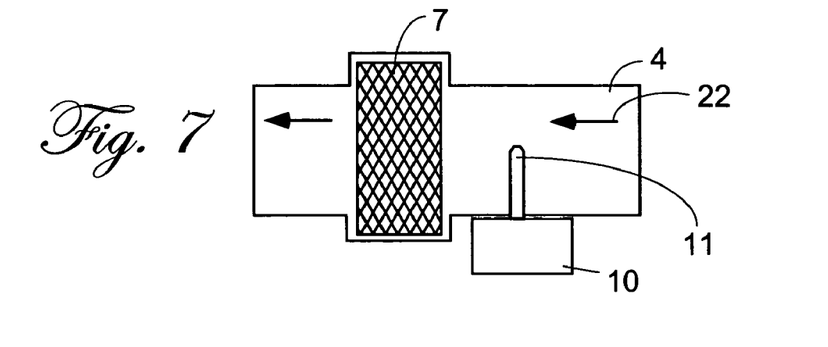
FIG. 7 shows a circuit of an air filter clogging detector with an air flow sensor.

FIG. 7 shows an air flow rate sensor installed into return duct 4 upstream from filter 7. Air flow rate probe 11 may be of several designs. For example, it may have a rotating vane, tilted vane, and many other designs known in art. However, from a practical standpoint, the preferred embodiment of this invention uses a thermo-anemometer (related to a hot wire anemometer known in art). A general principle of thermo-anemometry is well known in industry for measuring flow of fluids. The basic theory of the principle is described in book: *Jacob Fraden. Handbook of Modern Sensors. Springer Verlag.* $3^{rd}ed.$, pp. 359–380. In this invention, a thermo-anemometer probe is novel in its design and operation. A tip of thermo-anemometer probe 11 is positioned approximately in the middle of the air flow duct and is connected to flow monitor 10.

Figure 8:
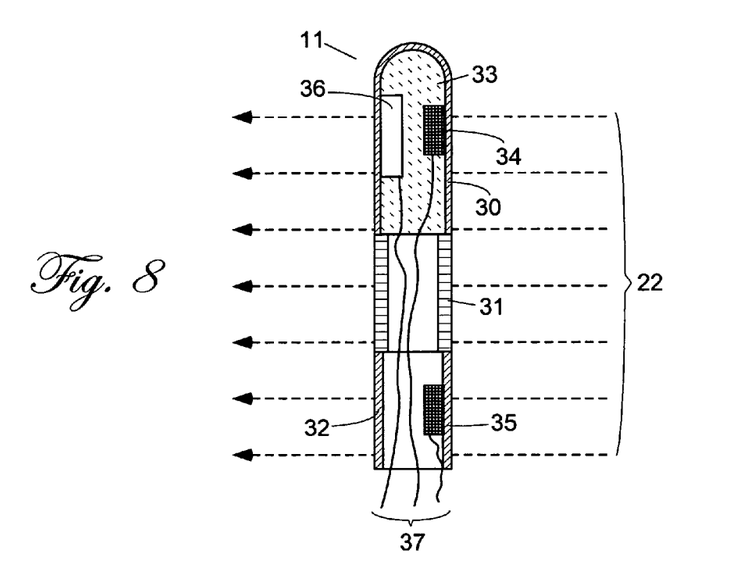
FIG. 8 is a cross-sectional view of a thermo-anemometer probe with two temperature sensors.

A first example of thermo-anemometer probe 11 for measuring air flow rate is shown in FIG. 8. The probe is comprised of three parts: metal head 30, thermal insulator 31 and metal plate 32. The entire assembly is supported by an insulating support base (not shown) and should have a good mechanical integrity. Head 30 and plate 32 must be thermally decoupled from one another and both shall be thermally coupled to air flow 22. Inside head 30, there are two components: first temperature sensor 34 and heater 36. These are thermally attached to each other and to head 30. To improve a thermal coupling between them, the interior of head 30 may be potted with thermally conductive epoxy 33. Second temperature sensor 35 is thermally attached to plate 32. Its purpose is to measure temperature of air. The sensors and the heater are connected to an external electronic circuit through wires 37. Sensors 34 and 35 preferably should be the NTC thermistors, however other types of temperature sensors may be employed.

Figure 9:
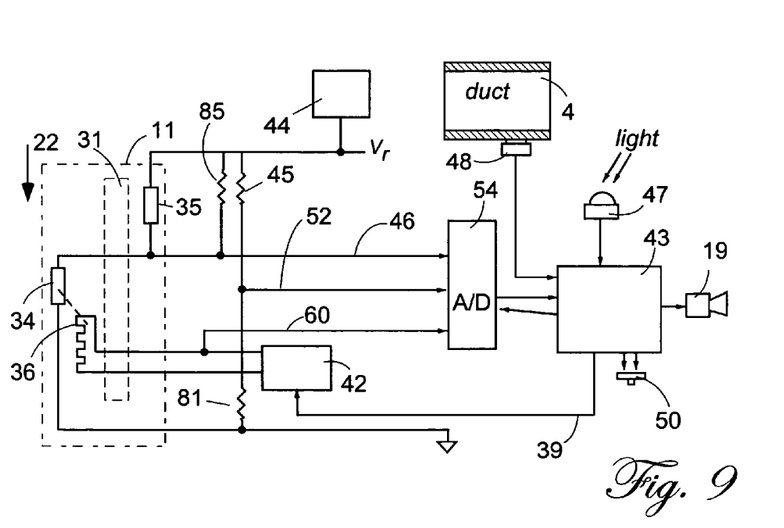
FIG. 9 is a schematic of an air filter clogging detector for two temperature sensors.

Probe 11 of FIG. 8 operates as follows. Heater 36 warms up head 30 to a predetermined fixed level (3 to 5° C.) above the air temperature. The head's 30 temperature is measured by first temperature sensor 34 and the air temperature is measured by second temperature sensor 35. Insulator 31 prevents warming up plate 32 by heater 36. The schematic of FIG. 9 shows that temperature sensors 34 and 35 are connected in series, forming a voltage divider, and fed with reference voltage $V_r$ from power supply 44. Heater 36 is of a resistive type and is supplied by electric current from heater controller 42. Resistor 85 is connected in parallel with the air temperature sensor 35 (not heated). It is needed for correcting the effects of the air temperature variations. Signal 46 is converted into digital format by analog-to-digital (A/D) converter 54. Voltage 52 from a voltage divider formed by resistors 45 and 81 is also converted to a digital format (by A/D converter 54) and fed into controller 43. The magnitude of voltage 52 is selected to be equal to signal 46 at the heater temperature elevated above the air temperature by a preselected amount.

If heater 36 is turned off, signal 46 from the temperature sensors would be equal to one half of $V_r$ (assuming the identical temperature sensors 34 and 35).

If heater 36 is turned on, controller 43, being part of a servo circuit, through feedback line 39 and heater controller 42 warms up heater 36 to such temperature when signal 46 becomes equal to voltage 52. In other words, thermal energy produced by heater 36 elevates temperature of first sensor 34, causing signal 46 to drop (if an NTC thermistor is used). The servo circuit adjusts electric current through heater 36 to keep first temperature sensor 34 warmer than second temperature sensor 35 by a fixed number of degrees. This works over the entire ranges of the air flow and air temperatures.

When air is not moving, heat is lost from head 30 to the environment in proportion to a static thermal resistance. When air is moving, air flow 22 removes more thermal energy from head 30, resulting in a disbalance between signal 46 and voltage 52. This causes controller 43 to adjust feedback line 39 to pump more electric current into heater 36 and restore the head's 30 temperature to the originally preset level of voltage 52. The faster air moves the more thermal energy is lost from head 30. In other words, a thermal resistance between head 30 and the environment becomes smaller. Thanks to the servo circuit ability to maintain a constant temperature gradient of head 30 above the air temperature, voltage 60 across heater 36 will increase in relationship with the air flow rate. This voltage is an analog output of a thermo-anemometer and is converted to a digital format and fed into controller 43. The controller compares it with a stored digital threshold value representative of a clogged filter air flow rate. When the threshold is reached, alarm 19 is enabled. Alarm 19 can be audible, visual or both or, alternatively, it can be any other type of an indicator.

The circuit of FIG. 9, where two temperature sensors 34 and 35 are connected in series, provides a reliable compensation of the air temperature variations so that flow signal 46 depends very little on the air temperature—an important feature. Several corrections to an alarm threshold level 13 can be made by controller 43. One correction would correspond to the air blower power variations, for example, when air blower switches from a heating mode to a cooling mode (controlled by a thermostat). Other factors that affect the alarm threshold are the actual properties of an air filter and the air duct geometry. It is important to set the alarm threshold level to a specific value before the monitoring starts. In other words, the unique threshold must be individually calibrated for each clean filter installed in a particular system. A calibration preferably would require two flow rate points positioned at the opposite ends of the air flow range. The calibration is done at the time when a new air filter is installed and the air flow is at its peak for a given blower power. After the filter is installed, pushbutton 50 is depressed and signal 60 is stored in a memory (not shown) to indicate a maximum flow rate corresponding to a clean filter. This is the first calibration point. To obtain the second calibration point, another value of signal 60 is stored at the time when air blower is turned off. This is an equivalent of a 100% clogging of the air filter since no air flow exists around probe 11. An alarm threshold is set between these two calibration points at an arbitrary level, depending on the application and specific requirements. For a residential installation it may be set at a 50% level of the air flow rate drop.

Whenever the air blower's power changes, the air flow rate will change as well, regardless if the filter is clean or clogged. This may happen when the air treating system switches from a heating (low power of the blower) to air conditioning (high power of the blower) mode. If such changes in the blower power are not accounted for, the alarm may be triggered for a wrong reason. To prevent a false alarm, an adjustment for variations in the blower power is essential. One way to adjust is to make the alarm threshold variable (floating) with the blower power variations. This can be done by either wiring the blower with the clogging detector or by using a software correction in controller 43. The latter solution is based on the fact that the air flow rate changes very slowly when the air filler accumulates dirt, while it changes abruptly when the blower power is switched up or down. The abrupt change in the blower power can be detected by comparing the current air flow rate with that from the prior measurements. If the rate jumps up, the alarm threshold shall be proportionally increased. When the rate drops abruptly, the alarm threshold shall be scaled down.

In a practical device, several more features would be highly beneficial to enhance its efficiency. One is a reduction in power consumption of the clogging detector, so the entire detector could operate from a small battery for a long time. Obviously, heater 36 is the most power "hungry" component of the device. If a power supply is a no limitation, heater 36 may remain always on and all other components of the device may operate continuously. This however will be very taxing on power supply 44, if it is based on a battery. Since dust doesn't accumulate fast inside an air filter, only a periodic air flow detection would be sufficient in most practical cases. For example, the monitoring can be performed only once every 24 hours, thus saving the battery energy. Besides, it should be done only when blower 5 operates, otherwise, there is no air flow to measure.

Controller 43 may incorporate a timing circuit that enables the circuit operation once a day, e.g. A typical blower doesn't spin all the time. It is switched on and off by an external thermostat, hence, a timer alone is not sufficient to enable the monitoring. The air filter clogging detection shall be performed only when the air blower is turned on. Naturally, a hard wiring from the blower or a thermostat to monitor 10 can provide a control signal. This, however, may be not practical. Therefore, the clogging monitor 10 should be provided with an additional air flow detector having a low power consumption. Its sole purpose will be to detect if air is moving without measuring the actual flow rate. Generally, the detector can be a vibration or noise detector. One example is a piezoelectric microphone. Microphone 48 is physically attached to air duct 4 near the blower to monitor sounds resulted from operation of the blower and air movement. When controller 43 is ready to monitor the air flow, it enables microphone 48, which starts "listening" to the air duct sounds and vibrations. Noise from the air blower would be detected by microphone 48 thus signaling controller 43 to start the measurement. At that time, controller 43 activates heater controller 42 and the rest of the circuit. When the air filter clogging monitoring is complete, controller 43 either enables alarm 19 (if the filter clogging is detected) or turns the heater off and waits for another monitoring cycle.

Figure 10:
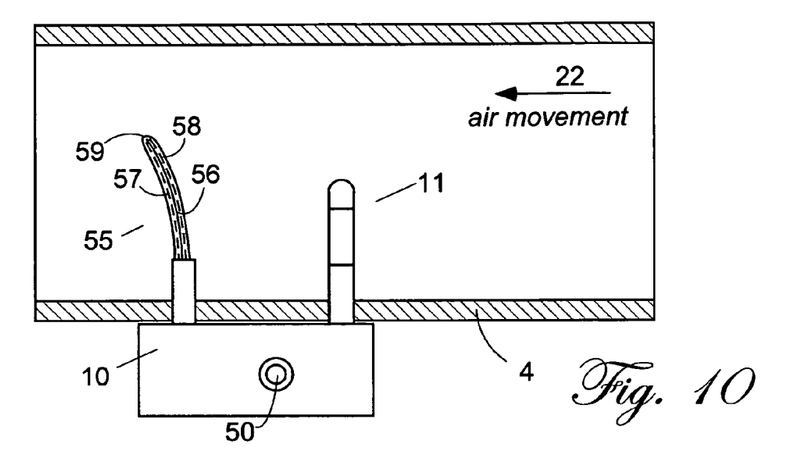
FIG. 10 shows a clogging detector with a piezoelectric switch.

Alternatively to microphone 48, another type of a vibration detector or accelerometer with a very low power consumption may be used. An example is a piezoelectric switch. Such a switch with a PVDF film was illustrated in the above indicated book by Fraden (page 330, FIG. 9.6). FIG. 10 shows installation of the switch into air duct 4. Switch 55 consists of laminated PVDF film 56 and two electrodes 57 and 58. The switch is flexible and can bend easily. It is encapsulated into thin flexible envelope 59 which can be fabricated of any suitable polymer or paper. The PVDF film can produce electric charge if flexed. When the blower is activated and air flow 22 appears, switch 55 bends, flips and vibrates in the moving air, producing electrical spikes that are detected by monitor 10 and used to enable measurement of the air flow.

When the air filter clogging is detected, the alarm is enabled. However, actuating alarm 19 at any time may be quite inconvenient and would consume too much power from the battery. It is not desirable to actuate alarm say in the middle of the night or when nobody is listening or watching. In a typical house, the air blower and the air treatment equipment is positioned in a basement, closet, garage, or some other location that is separated from the living quarters. The alarm should be actuated only when someone is present near the equipment to perceive the alarming event. This can be accomplished by supplying the air filter detector with some kind of a presence or occupancy detector. The simplest form of such a detector is a light sensor 47 (FIG. 9). The location of an air filter is usually dark when no one is present near the equipment. When people are present, they usually turn lights on or open a door or window. The increased ambient illumination will be detected by light sensor 47 which would enable alarm 19. Even if a clogged filter has been detected, alarm 19 will not operate unless lights are turned on and detected by sensor 47.

Figure 11:
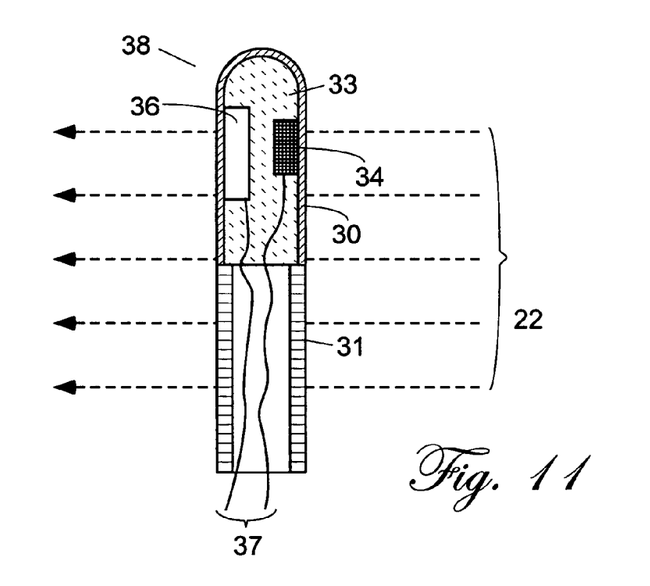
FIG. 11 is a cross-sectional view of a thermo-anemometer probe with one temperature sensor.
Figure 12:
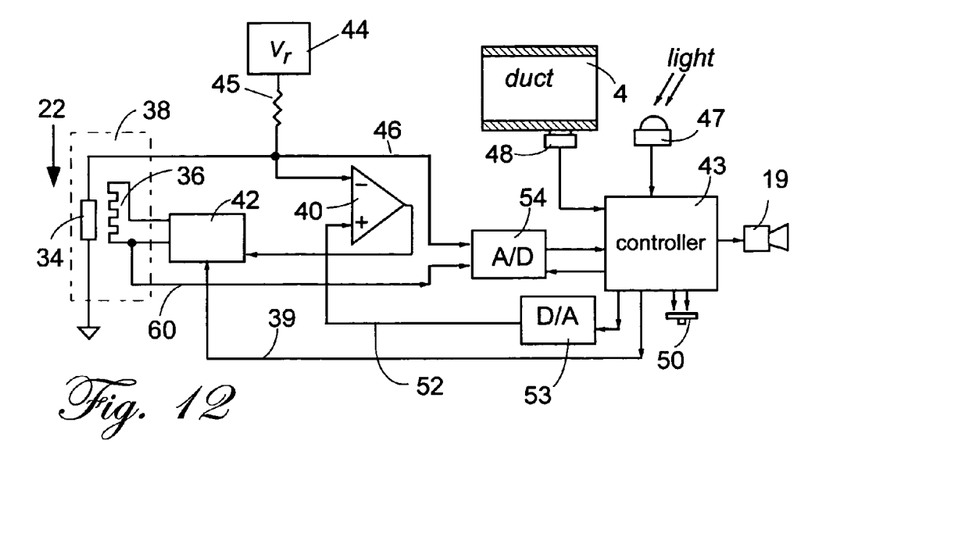
FIG. 12 is a schematic of an air filter clogging detector for one temperature sensor.

Another example of the air flow rate probe is illustrated in FIG. 11 as probe 38. It is a simplified version of probe 11 shown in FIG. 8. A simplification is possible if heater 36 can be turned on and off during the monitoring cycle, thus allowing the same first temperature sensor 34 to be used for both the air temperature compensation (the heater is off) and sensing the air flow rate (the heater is on). A simpler probe 38 contains only one temperature sensor 34 which has two functions: measure temperature of a warmed head 30 when heater 36 is on, and measure temperature of air when heater 36 is turned off. FIG. 12 shows a circuit to operate probe 38. In many respects it is similar to the circuit of FIG. 9, yet there are significant differences. As an illustration, some functions are performed with the analog circuits and some with the digital circuits. In a practical device however, most of the functions can be handled by controller 43. Temperature sensor 34 is connected to pull-up resistor 45 which is attached to a reference voltage $V_r$ from power supply 44.

Since there is no second temperature sensor that would measure the air temperature, the first sensor will have two functions separated in time: measure the air temperature and measure the rate of air flow. The air temperature must be measured to establish both the servo loop reference level 52 and the alarm threshold. When level 52 is computed by controller 43, it is generated as an analog signal from digital-to-analog (D/A) converter 53. An empirical equation to compute level 52 for a typical NTC thermistor is $$V_{52} = \frac{V_r}{2} - 0.01 - 0.048 V_{46Z}, \qquad (1)$$

where $V_{46z}$ is voltage of signal 46 from sensor 34 with the heater turned off. Value of level 52 ($V_{52}$) is typically smaller than signal 46 ($V_{46z}$) by 0.2V.

To measure the air temperature, controller 43 shuts off heater controller 42 through wire 39. At that, the servo loop is disabled and sensor 34 measures the actual air temperature. During the time of measurement, signal 46 from temperature sensor 34 is received by A/D converter 54 and set point level 52 is computed from Eq. (1) and generated in an analog form. Set point level 52 and signal 46 from temperature sensor 34 are fed to amplifier 40 which controls heater controller 42 and, in turn, heater 36 when enabled. This forms a thermal servo loop circuit. The circuit is set to maintain temperature of temperature sensor 34 few degrees above the air temperature.

When the resistive heater is turned on, signal (voltage) 60 across the heater is fed to A/D converter 54 as a representative of air flow rate. The rest of the circuit operation is analogous to that of FIG. 9.

Figure 13:
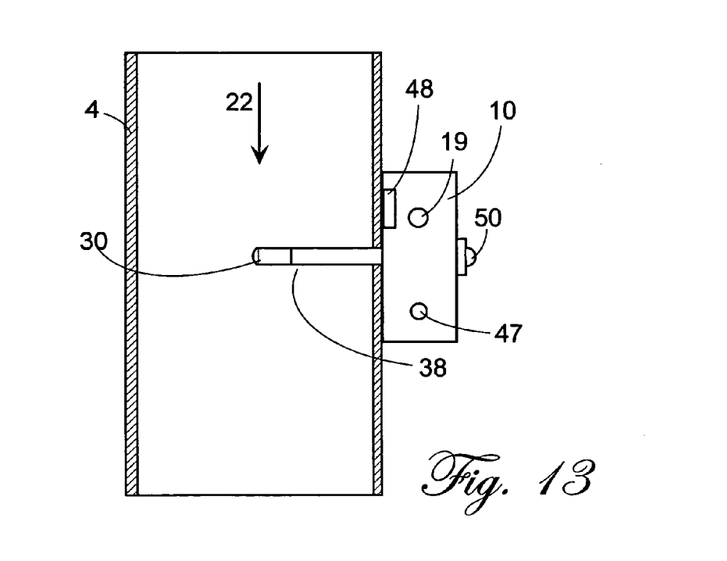
FIG. 13 depicts the air filter monitor installed onto an air duct.

FIG. 13 illustrates monitor 10 installed onto the outside wall of air duct 4. Probe 38 protrudes inside the duct approximately up to the middle of the duct's width. Microphone 48 is positioned inside of monitor 10 in proximity to the air duct. Air flow 22 will pass around probe head 30. Alarm 19, light sensor 47 and pushbutton 50 are situated on the housing of monitor 10 which acts as a support base for probe 38.

To summarize the method and operation of the air filter clogging detector, consider the following typical steps as pertinent to the circuit of FIG. 12 operating with probe 38:

1. A new or cleaned air filter is installed into the air duct and pushbutton 50 on the detector is pressed when the blower is off and no air is moving near probe 38. The pushbutton turns on the "self-calibration mode".
2. Controller 43 enters the "self-calibration mode" in which the alarm threshold is going to be established for a newly installed filter. Heater 36 is turned off and signal 46 is measured as level "A" representing the air temperature.

Set point level 52 is computed by controller 43 on the basis of sensor 34 characteristics, the selected temperature increase, and level "A".

3. The heater is turned on and after the servo circuit stabilizes for set point 52, signal 60 is measured and stored as a first reference point "Z" corresponding to zero air flow or an equivalent of a 100% clogging of the air filter. The heater then is turned off.
4. Controller 43 waits for a signal from microphone 48 that would indicate actuation of blower 5. During that time, power consumption from a power supply is low.
5. Signal from microphone 48 is received.
6. The heater is turned, the servo circuit is enabled and the air flow rate can be measured.
7. Signal 60 now represents air flow rate through a clean filter. The signal's 60 value "C" is stored inside controller 43.
8. Controller 43 computes an alarm threshold for a selected point between values "Z" and "C" and stores that value as "TH" for future monitoring. This concludes the self-calibration phase.
9. All peripheral circuits are turned off and controller 43 enters into the "wait" mode (a low power consumption).
10. After a preselected wait period, for example 24 hours, microphone 48 is enabled for receiving vibration signals from the air duct.
11. When a vibration signal is detected, the "monitoring" cycle starts.
12. The heater stays off and signal 46 is measured as level "A" representing the particular air temperature at the time of monitoring. Set point 52 is computed by controller 43 on basis of the sensor 34 characteristics, the selected temperature increase and level "A" of a particular air temperature.
13. The heater is turned on and after the servo circuit stabilizes for set point 52, signal 60 is measured and stored as value "F" corresponding to the actual air flow rate. The heater then is turned off to conserve power.
14. Value "F" is compared with the alarm threshold "TH". If value "F" is above the alarm threshold, the device again goes to the "wait" mode to for another 24 hours until the next filter test as in step 10 above.
15. If value "F" drops below the alarm threshold "TH", alarm 19 is set ready.
16. When light sensor 47 detects the increased illumination, alarm 19 is activated. It will be turned off when lights go off or a new filter is installed and the cycle is repeated as in step 1 above.

Figure 14:
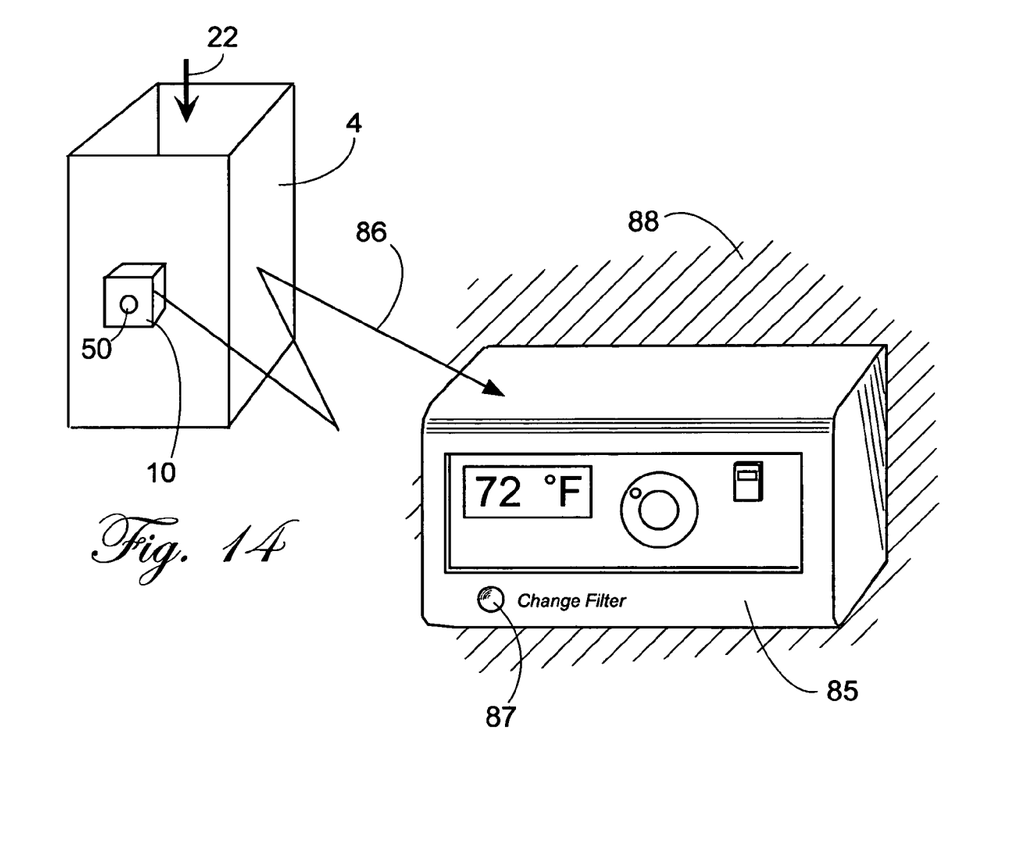
FIG. 14 is an illustration of a wireless link between the monitor and a thermostat.

In some applications, it may be desirable to separate an alarm from the actual air filter clogging detector that is installed onto an air duct. This may require a wiring of the detector to a remote indicator or alarm. Alternatively, a wireless communication may be used from the detector to an indicator or alarm as illustrated in FIG. 14. Monitor 10 is attached to air duct 4 near furnace or air conditioner. Monitor 10 has a built-in radio transmitter (not shown) with the associated electronic circuits. The alarm or indicating light 87 is positioned on a remote thermostat 85 which is attached to wall 88. The thermostat is of a conventional design and use. However, in addition to the conventional components, it contains a radio receiver (not shown) which receives radio signal 86 that is transmitted in the event when an air filter becomes clogged.

Naturally, a similar type of a monitoring may be used in other systems where any gas is moved. An example is a vacuum cleaner which may be equipped with an air filter clogging monitor. We do not illustrate vacuum cleaner applications as this can be easily inferred from the above description by those skilled in art.

Internal Combustion Engine Applications

Figure 15:
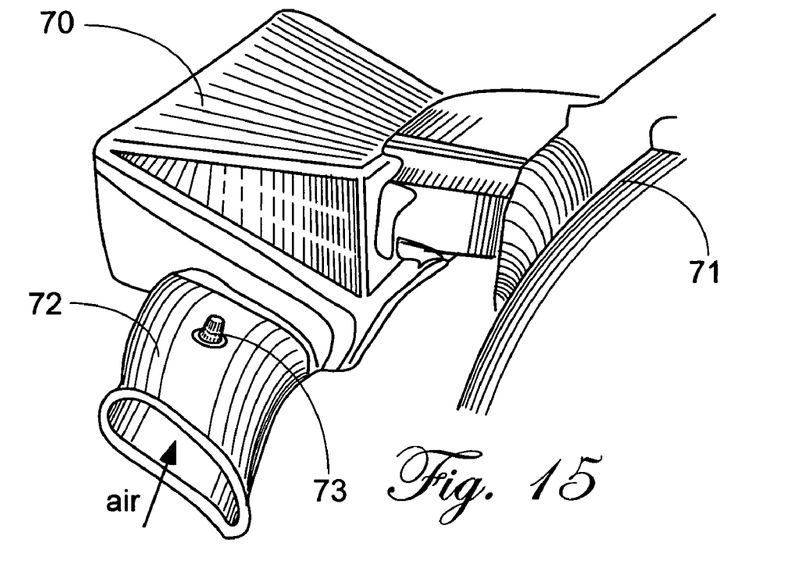
FIG. 15 shows a probe arrangement for an internal combustion engine.
Figure 16:
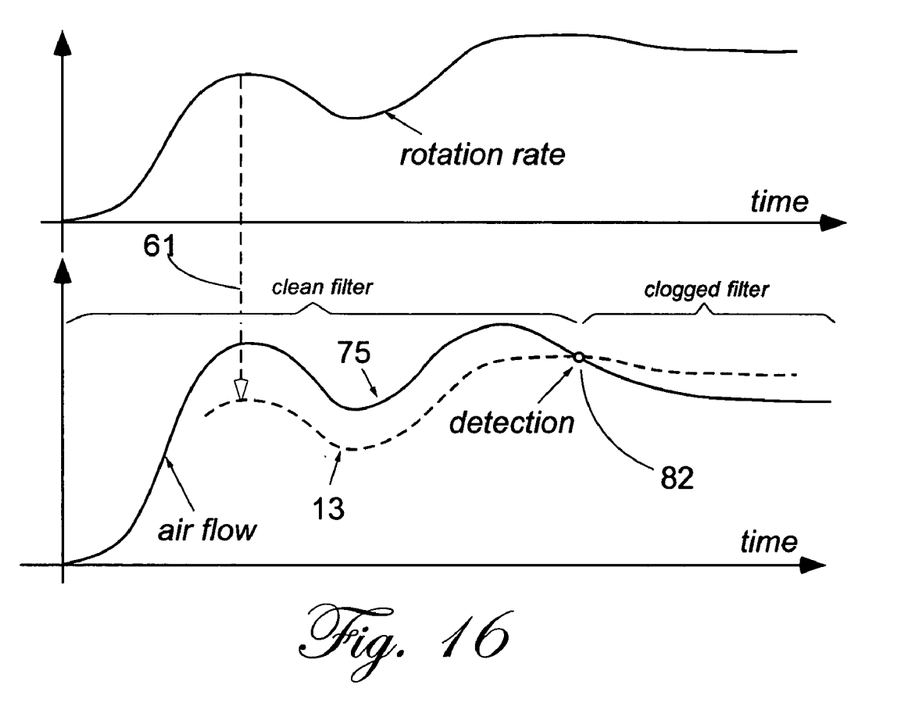
FIG. 16 is a timing diagram indicating floating threshold for the variable blower applications.

A clogging detector based on air flow measurement as described above is a natural application for automotive and other machines where internal combustion engines are in use. FIG. 15 illustrates an air filter assembly 70 as part of internal combustion engine 71 (shown partially). Air inlet 72 is positioned upstream from the filter and carries air flow sensor 73. The sensor is electrically connected to a monitor and indicator (not shown) that may be included as parts of the automobile electronic equipment. The operating principle is similar to the above described, however, with some additional improvements. Specifically, the detector shall be adaptive to a variable air flow resulting from a continuously changing engine ration rate. A control of the alarm threshold by the engine rotation rate is essential. As a rule, in all engines the rate of rotation is measured and these data are available. The signal may come from a magnetic rotation rate sensor. This information can be used to correct the clogging detector's alarm threshold. The correction can be done as illustrated in FIG. 16. The rotation rate directly controls 61 threshold 13 that follows the rotation rate as it changes. The air flow varies with the engine rotation rate as well, yet it is also affected by the filter clogging. This second factor will force the air flow rate signal 75 dropping below threshold 13 at point 82 when the filter is clogged, thus causing an indication.

It should be clearly understood that the above described applications employ the thermo-anemometer of a novel design that automatically compensates for ambient temperature variations, has a predictable response and provides a signal that is substantially dependent only on the air flow rate. This signal can be used not only for detection of clogging of various air filters, but for any other needs where movement of gas needs to be measured with high accuracy and low cost. In other words, a thermo-anemometer can be designed and used as a separate instrument.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein

We claim:

1. A gas filter clogging detector for installation at a gas conduit attached to a gas blower having power to move gas and a gas filter, comprises in combination:
    a base;
    a power supply;
    a flow rate sensor attached to said base and intended for monitoring a flow rate of gas by generating the output signal, being positioned at the gas conduit;
    a threshold value generator;
    a threshold comparator for comparing the said output signal with a selected threshold value and producing the alarm;

where said flow rate sensor contains a heater and producing the output signal as function of electric power supplied to said heater.

2. A gas filter clogging detector of claim 1, where temperature of said heater is maintained higher than gas temperature by a substantially constant value.

3. A gas filter clogging detector of claim 1 where the threshold value varies with power of the gas blower.

4. A gas filter clogging detector of claim 1 further comprising a radio transmitter for sending a signal indicative of the gas filter clogging.

5. A gas filter clogging detector of claim 1 further comprising a vibration sensor to detect a moment of air blower operation in order to start monitoring.

6. A gas filter clogging detector of claim 1 further comprising a presence detector to enable alarm when people are present in the vicinity of said alarm.

7. A thermo-anemometer probe for monitoring rate of gas flow comprising
   a support base,
   a thermally conductive head attached to support base and positioned in a stream of a monitored gas,
   a temperature sensor thermally coupled to said head,
   a heater, thermally coupled to said head,
   a thermal insulator positioned between said head and said base the electronic circuit for controlling electric current through the heater, processing data and outputting the result of gas flow monitoring as function of electric power supplied to said heater.

8. Thermo-anemometer probe of claim 7 wherein said heater maintains temperature of said temperature sensor higher than temperature of gas by a substantially constant value.

9. Thermo-anemometer probe of claim 7 wherein said support base further contains
   a thermally conductive plate connected to said thermal insulator and thermally decoupled from said head,
   a second temperature sensor connected to said plate.

10. Thermo-anemometer probe of claim 7 where the second temperature sensor is a thermistor.

11. Thermo-anemometer probe of claim 8 where a temperature sensor is a thermistor.

12. Method of monitoring a degree of gas filter clogging comprising the steps of
   positioning a gas flow sensor into a stream of gas,
   determination of a reference level of a gas flow rate through a clean gas filter,
   computation of an alarm threshold as a fraction of the reference level of gas flow rate,
   setting up the alarm threshold,
   monitoring a current level of a current gas flow rate for a filter during it normal operation,
   comparing the current level of a gas flow rate with said alarm threshold,
   producing indicative signal in case of crossing the level of a current gas flow rate with said alarm threshold.

* * * * *